(12) United States Patent
Morad et al.

(10) Patent No.: US 11,109,724 B2
(45) Date of Patent: *Sep. 7, 2021

(54) SYSTEMS, METHODS, AND APPARATUS FOR DISPENSING SHEETS OF MATERIAL

(71) Applicant: THE TRANZONIC COMPANIES, Cleveland, OH (US)

(72) Inventors: Fred I. Morad, Toluca Lake, CA (US); Robert A. Acosta, Norwalk, CA (US)

(73) Assignee: THE TRANZONIC COMPANIES, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/145,654

(22) Filed: Jan. 11, 2021

(65) Prior Publication Data
US 2021/0161336 A1 Jun. 3, 2021

Related U.S. Application Data

(63) Continuation of application No. 16/884,580, filed on May 27, 2020, now Pat. No. 10,888,203, which is a continuation-in-part of application No. 16/159,969, filed on Oct. 15, 2018, now Pat. No. 10,874,268, which is a continuation-in-part of application No. 15/313,495, filed as application No. PCT/US2016/031363 on May 6, 2016, now Pat. No. 10,149,583.

(51) Int. Cl.
| | |
|---|---|
| *A47K 10/44* | (2006.01) |
| *A47K 17/00* | (2006.01) |
| *A47K 13/16* | (2006.01) |
| *A47K 10/42* | (2006.01) |
| *G01P 13/00* | (2006.01) |

(52) U.S. Cl.
CPC .......... *A47K 17/003* (2013.01); *A47K 10/424* (2013.01); *A47K 10/44* (2013.01); *A47K 13/165* (2013.01); *G01P 13/00* (2013.01)

(58) Field of Classification Search
None
See application file for complete search history.

(56) References Cited

U.S. PATENT DOCUMENTS 10,888,203 B2 * 1/2021 Vuylsteke ............... G01P 13/00

* cited by examiner

*Primary Examiner* — Gene O Crawford
*Assistant Examiner* — Ayodeji T Ojofeitimi
(74) *Attorney, Agent, or Firm* — Taft Stettinius & Hollister LLP; Ryan O. White; Daniel J. Krieger (57) ABSTRACT

A sheet dispensing apparatus to dispense sheets from a sheet material card having a plurality of sheets. The sheet dispensing apparatus includes a door, a door plate, a back plate, and a motor including a motor shaft, wherein the motor is operatively connected to the door plate, and a motor wheel is operatively connected to the motor shaft. The motor wheel is driven by the motor shaft to detach a sheet from the sheet material card. The apparatus further includes a first light pipe having a first end and a second end, wherein a signal transmitted at the first end of the first light pipe is received at the second end if the correct sheet material card is being used. A second light pipe receives a signal at the first end and receives the signal at the second end, if the sheet material card is not present or out of sheets.

20 Claims, 8 Drawing Sheets

SYSTEMS, METHODS, AND APPARATUS FOR DISPENSING SHEETS OF MATERIAL

CROSS-REFERENCE TO RELATED APPLICATIONS

This application is a continuation of U.S. patent application Ser. No. 16/884,580, having the title SYSTEMS, METHODS, AND APPARATUS FOR DISPENSING SHEETS OF MATERIAL, filed May 27, 2020, which is a continuation-in-part of U.S. patent application Ser. No. 16/159,969, having the title SYSTEMS, METHODS, AND APPARATUS FOR DISPENSING SHEETS OF MATERIAL, filed Oct. 15, 2018, which is in turn a continuation-in-part application of U.S. patent application Ser. No. 15/313,495, having the title SYSTEMS, METHODS, AND APPARATUSES FOR DISPENSING SHEETS OF MATERIAL, filed Nov. 22, 2016, issued as U.S. Pat. No. 10,149,583, and which claims priority to European Patent Application No. 15001414.0, filed on May 12, 2015, issued as EP3092926B1, all of which are incorporated by reference herein in their entirety.

FIELD OF THE DISCLOSURE

The present invention relates to a machine that dispenses a product, and more particularly to a sheet dispensing machine that dispenses a sheet of material from a stack of materials.

BACKGROUND

Reliably dispensing sheets of material, including for example paper products from a stack of joined paper products, is often difficult. For example, the stack of material sheets may be joined at one end in a manner such that the application of an appropriate force upon a single sheet will cause it to separate from the remainder of material sheets. In many dispensers of such materials, a mechanical arm may contact the outermost sheet in the stack and tear it away from the remainder of the stack. However, the mechanical arm often contacts the sheet material in a very small area relative to the area of the sheet material itself. As a result, where the material sheets do not have great tensile strength, the sheets are prone to tearing during dispensing. Additionally, the mechanical arm may not disengage the outermost sheet after the outermost sheet is torn away from the remainder of the stack, causing difficulty in the ultimate removal of the sheet material from the dispenser. One such example of the dispensing of material sheets is in the use of thin material sheets used to provide a sanitary barrier between a user of a device and the device, including for example, toilet seat covers.

What is needed is a more reliable system, method, and apparatus for dispensing sheets of material. The present application appreciates that providing such a system, method, and apparatus may be a challenging endeavor.

SUMMARY

In one embodiment, there is provided a sheet dispensing apparatus configured to dispense a sheet from a sheet material card having a plurality of sheets wherein the sheet material card is supported in the apparatus. The sheet dispensing apparatus includes a door plate, a back plate, and a motor plate resiliently coupled to the door plate and resiliently biased towards the back plate. A motor including a motor shaft, is operatively connected to the motor plate. A motor wheel is operatively connected to the motor shaft and includes a first radius defined between the motor shaft and a radiused surface of the motor wheel, and a second radius defined between the shaft and a truncated portion of the motor wheel. A roller includes a roller surface and the roller is operatively connected to the motor shaft, wherein the distance between the roller surface and the motor shaft is less than the first radius and greater than the second radius.

In another embodiment, there is provided a sheet dispensing apparatus configured to dispense sheets from a sheet material card having a plurality of sheets, wherein the sheet material card is supported in the apparatus. The sheet dispensing apparatus includes a door plate, a back plate, and a motor including a motor shaft wherein the motor is operatively connected to the door plate. A motor wheel is operatively connected to the motor shaft and the motor wheel is driven by the motor shaft to detach a sheet from the sheet material card. The apparatus further includes a first light pipe having a first end and a second end. A first transmitter transmits a first signal toward the first end of the first light pipe, wherein the first transmitter spaced from the first end of the first light pipe. A first receiver to receive the transmitted first signal from the second end of the first light pipe, the first receiver being spaced from the second end of the first light pipe.

In a further embodiment, there is provides a method of dispensing a sheet from a sheet material card having a plurality of sheets supported in a sheet dispensing apparatus having a motor wheel to detach a sheet from the sheet material card for dispensing to a user. The method includes: transmitting a first signal to a first end of a first light pipe; receiving the first signal from a second end of the first light pipe; and enabling, upon receiving the first signal, detaching a sheet from the sheet material card with the motor wheel.

In an additional embodiment there is provided a sheet dispensing apparatus for dispensing one or more sheets from a plurality of sheets. The apparatus includes a light pipe and a first transmitter to transmit light. The first transmitter is spaced from a first end of the light pipe and the first transmitter is adapted to transmit light through the first end of the light pipe. A first receiver is configured to receive light. The first receiver is spaced from a second end of the light pipe to receive light transmitted by the first transmitter through the light pipe. A dispensing mechanism is configured to dispense one or more sheets from the plurality of sheets. A controller is operatively connected to the dispensing mechanism and to the first receiver. The controller includes a processor and a memory configured to store program instructions. The processor is configured to execute the stored program instructions to: determine whether the transmitted light is received or not received by the first receiver; and if received, enable the dispensing mechanism to dispense a sheet from the plurality of sheets.

In another embodiment there is provided a method of dispensing a sheet from a plurality of sheets attached to a sheet support located in a sheet dispensing apparatus having a dispensing mechanism. The method includes: transmitting a first signal from a first side of the sheet support toward a first end of a first light pipe located on a second side of the sheet support; receiving the first signal from a second end of the first light pipe; and enabling, upon receiving the first signal from the second end of the first light pipe, the dispensing mechanism to detach a sheet from the plurality of sheets.

In a further embodiment, there is provided a sheet material product for use by a sheet dispensing apparatus having standoffs to support the sheet material product and a wheel to dispense sheet material. The sheet material product includes a plurality of sheets and a support supporting the plurality of sheets. The support includes: i) a first slot and a second slot configured to engage the standoffs; ii) a first side; iii) a second side; and iv) a length, wherein a portion of each of the plurality of sheets extends beyond the length of the support. An aperture is disposed on the support, wherein the aperture enables transmission of a light beam from the first side of the support to the second side of the support.

BRIEF DESCRIPTION OF THE DRAWINGS

The accompanying figures, which are incorporated in and constitute a part of the specification, illustrate various example apparatuses, systems, and methods, and are used merely to illustrate various example embodiments.

DETAILED DESCRIPTION

Sheet material dispensers, such as that disclosed in European Patent Application Publication No. EP2522265 (A1), may utilize feed rollers in order to advance a sheet material from a sheet material storage device, such as a card of sheet products. The sheet material may be attached in a stack to the card (which may include a substrate configured to be attached to the interior of the dispenser) via a perforated, or otherwise limited, connection, such that the application of a force pulling the sheet material away from the card may cause it to separate at predesignated points. A single layer of sheet material may be accordingly advanced out of the dispenser so as to permit manipulation of the sheet material by a user, including allowing a user to grasp the sheet material and remove it completely from the dispenser. European Patent Application Publication No. EP2522265 (A1) is incorporated by reference herein in its entirety.

In one embodiment, the various dispensing apparatuses disclosed herein may be used for a specific purpose, including for example, the dispensing of thin paper toilet seat covers. The toilet seat covers may be contained and/or dispensed in a substantially flat state. The toilet seat covers may be contained and/or dispensed in a substantially folded state, so as to reduce the necessary size of the dispensing apparatus. However, it is understood that the various dispensing apparatuses disclosed herein may be used to dispense any of a variety of sheet materials from an internal storage area, including for example: a paper, a cardboard, a polymer, a metal, an alloy, an organic material, a textile, and the like. Further, it is understood that the various dispensing apparatuses disclosed herein may be used to dispense any sheet material contained on a card of sheet products.

In one embodiment, the various dispensing apparatuses disclosed herein may be used to dispense a perforated towel. In one embodiment, the various dispensing apparatuses disclosed herein may be used to dispense at least one of a flat fold towel, a soft fold towel, an inter-fold towel, a continuous roll towel, and a perforated roll towel.

Figure 1:
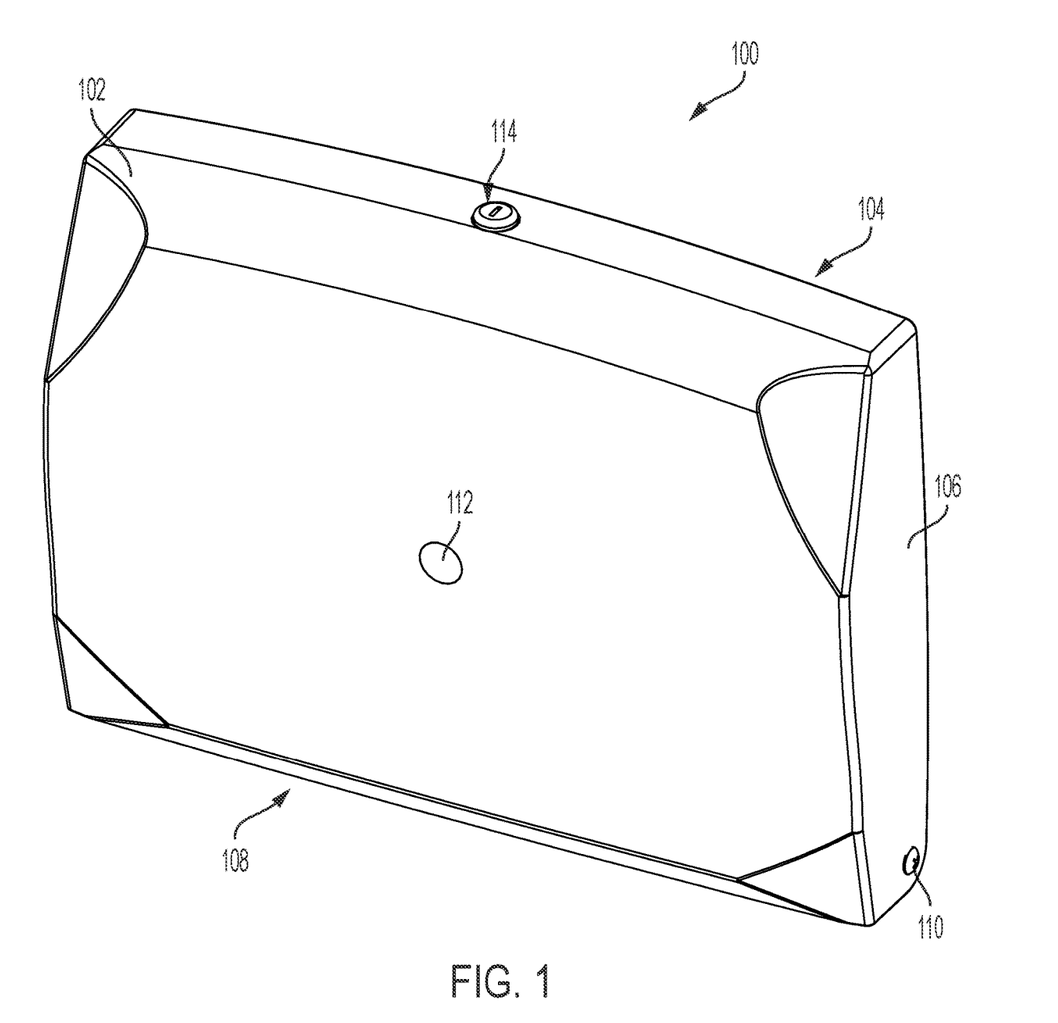
FIG. 1 illustrates a perspective view of a dispensing apparatus.

FIG. 1 illustrates an example arrangement of a dispensing apparatus 100. Apparatus 100 includes a door 102, a back plate 104, at least one side wall 106, and a dispensing port 108. A pivot connection 110 rotatably connects the door 102 to the back plate 104. Apparatus 100, in different embodiments, is formed from any of a variety of materials, including for example: a polymer, a metal, an alloy, an organic material, and the like. Apparatus 100 further includes any of a variety of shapes necessary to store and dispense sheet materials.

Apparatus 100 includes at least one sensor window 112 located in front of a sensor 232. See FIG. 4. The sensor 232 includes any of a variety of sensors configured to activate apparatus 100 to cause at least one article of sheet material to be dispensed. Sensor 232 is operatively connected to at least one of a printed circuit board, a power source, and a power supply.

In one embodiment, sensor 232 is an infrared sensor configured to sense the presence or movement of a user's body part, such as the user's hand, in the proximity of apparatus 100. The sensor 232 also senses the presence of movement of an object. The sensor 232, when configured as an infrared sensor, relays the sensing of the proximity or movement of a user's hand or an object to a printed circuit board (not shown), which causes an electric motor (not shown) to rotate a supply roller (not shown), which enables a single article of a sheet material to be dispensed from apparatus 100.

In another embodiment, sensor 232 is a capacitive sensor to sense motion. Capacitive sensor 232 may sense motion of a user near apparatus 100, such as a motion of a user's hand waved near apparatus 100, thus indicating that the user requests the dispensing of at least one article of a sheet material from apparatus 100. In other embodiments, capacitive sensor 232 is oriented within apparatus 100, rather than on door 102. That is, no sensor is present on door 102, in one embodiment, but rather the sensor is contained within apparatus 100.

In other embodiments, described as follows, sensor 232 includes a light sensor configured to sense lights activated near apparatus 100, such that the activation of lights near apparatus 100 causes apparatus 100 to dispense an article of a sheet material. Alternatively, sensor 232 includes a touch sensor, such that a user physically touches sensor 232 when the user desires the dispensing of a sheet material from apparatus 100. Furthermore, sensor 232 includes a microphone, and senses noise caused by a user, to cause apparatus 100 to automatically dispense a sheet material from apparatus 100 in anticipation of a user desiring an article of sheet material. In another alternative, sensor 232 includes a microphone configured to permit voice recognition capabilities, such that a user may speak a specific word or term to cause the dispensing of a sheet material from apparatus 100. In a further alternative, sensor 232 includes a temperature sensor, such as the body heat of a user present near apparatus 100, and dispenses an article of sheet material in anticipation of a user desiring an article of sheet material. An additional alternative of sensor 232 includes an RFID reader configured to sense the presence of a tag in the possession of a user, such that an article of sheet material is only dispensed to specific users. An additional alternative of sensor 232 includes a shock sensor configured to sense a user moving near apparatus 100, touching apparatus 100, tapping on apparatus 100 with an object or body part, or the like, after which apparatus 100 may dispense an article of a sheet material.

Sensor 232 may be in communication with an external surface of apparatus 100. Sensor 232 may be contained completely internally within apparatus 100.

In one embodiment, apparatus 100 does not include a sensor 232, but rather includes a switch actuated by a user when requesting the dispensing an article of sheet material. The switch includes any of a variety of switches configured to close a circuit, including for example, a button. In another embodiment, apparatus 100 includes both sensor 232 and a switch.

In one embodiment, apparatus 100 may include, with or without sensor 232, wireless networking capabilities, such that apparatus 100 may be remotely activated via a Bluetooth connection, a Wi-Fi connection, a radio signal, a cellular signal, or the like.

A key lock 114 is located at a top portion of the door 102 and is configured to receive a key for locking and unlocking the apparatus 100. By unlocking the key lock 114, the sheet material located within the apparatus can be refilled when there are no more sheets to dispense or when maintenance or repair is required. A catch 115 (see FIG. 2) moves between locked and unlocked positions to lock and unlock the apparatus 100.

Figure 2:
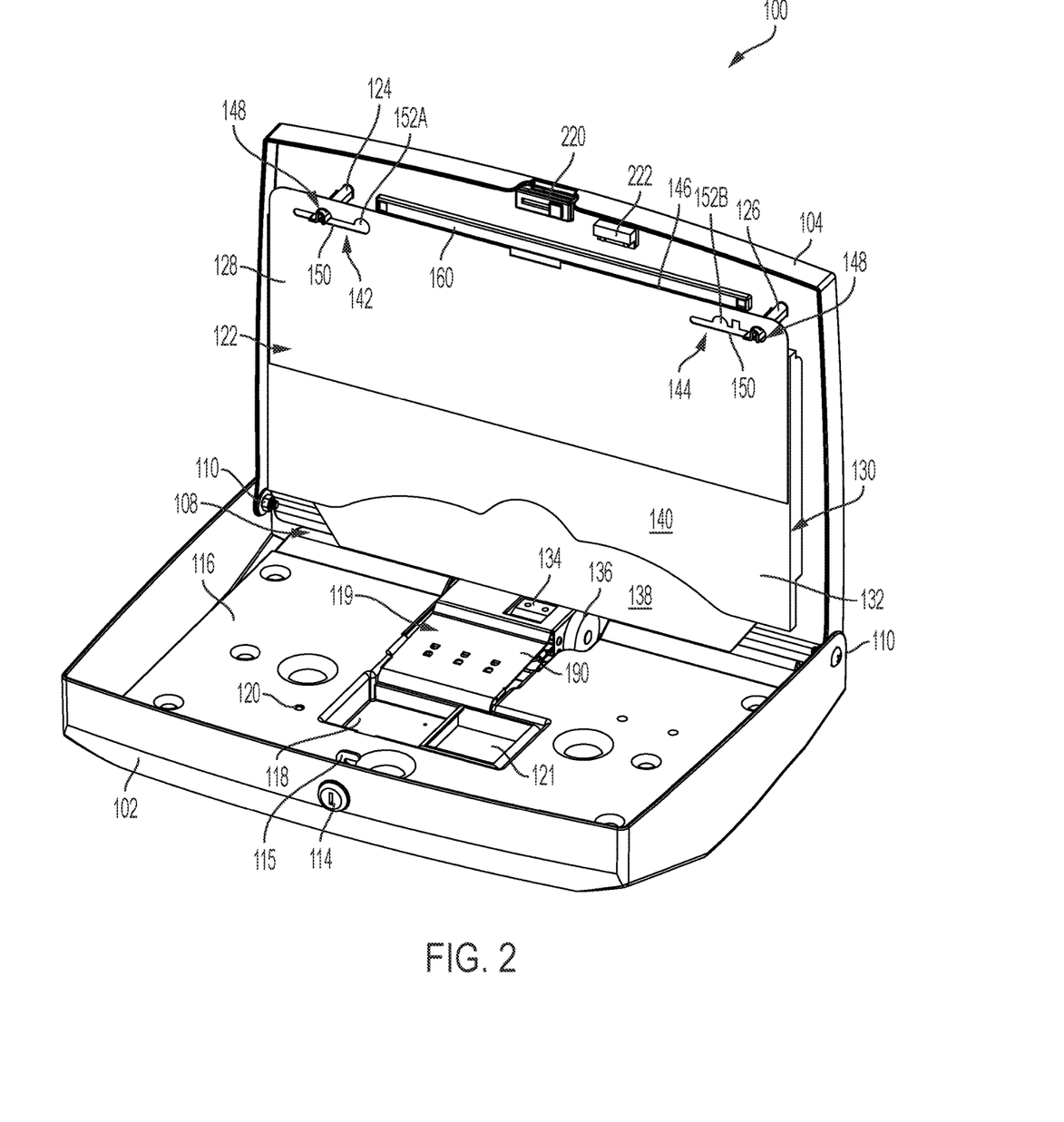
FIG. 2 illustrates a perspective view of a dispensing apparatus in an open condition including a sheet material card.

FIG. 2 illustrates the apparatus 100 in an open position in which the door 102 has been rotated around the pivot connection 110 to about a 90 degree angle with the back plate 104. In one or more embodiments, the back plate 104 is connected to a generally vertical support surface such as a wall of a building, a wall of a room, a wall of a washroom stall, or a wall of washroom dividers. Other degrees of pivoting are contemplated. In the open position, a door plate 116 is shown and fits within a cavity of the door 102. The door 102 and door plate 116 are further illustrated in FIG. 3.

Figure 4:
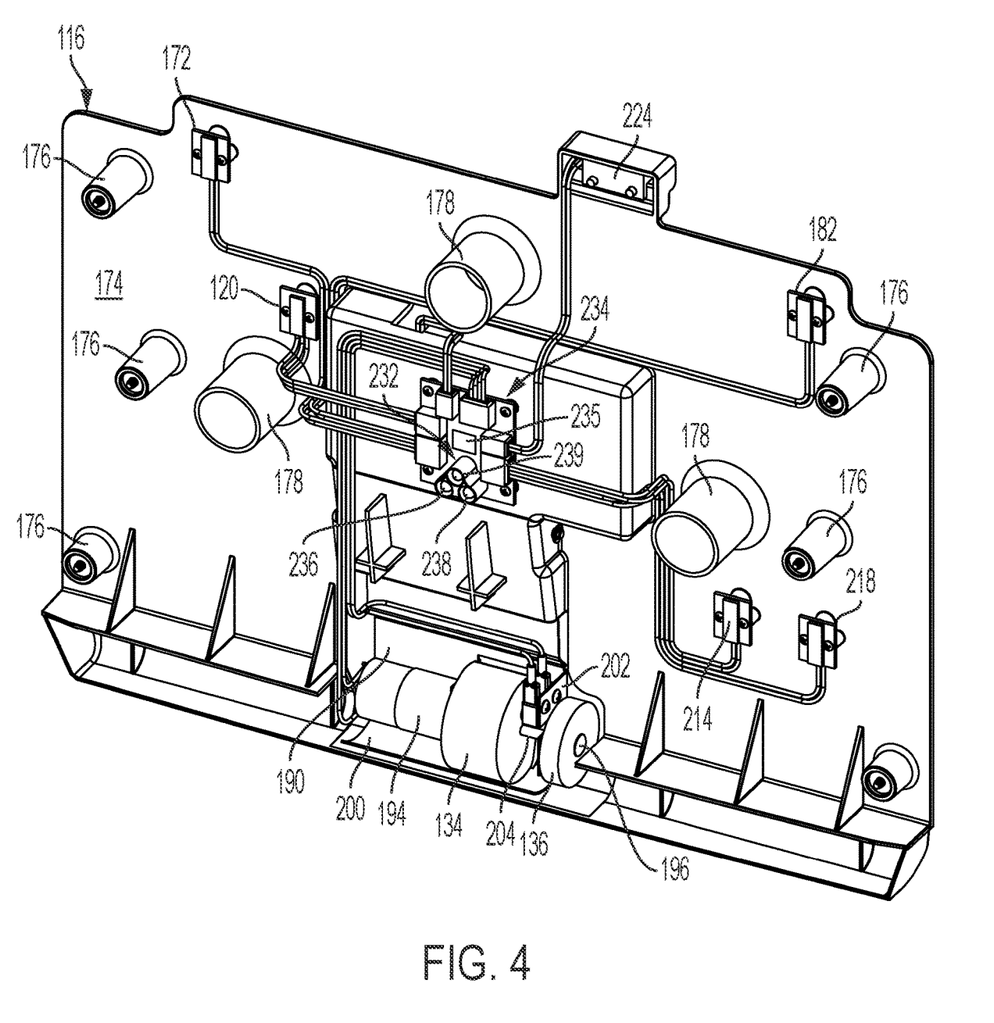
FIG. 4 illustrates a perspective view of another side of a door plate.

The door plate 116 includes a battery compartment 118 to hold one or more batteries (not shown) to provide power to operate a sheet dispensing mechanism 119 operatively connected to the door plate 116. A battery illumination device 120 is configured provide a visual indication of the amount of power provide by the batteries. In one embodiment, the battery illumination device 120 is a light emitting diode (LED) and the apparatus 100 is powered by four 1.5 volt batteries located in compartment 118. A second cavity 121 is configurable to receive additional batteries to extend the operating life of the apparatus before the batteries degrade sufficiently to prevent the apparatus 102 from dispensing. In one embodiment, the battery illumination device 120 includes three different colors, each of which signifies a battery level of the battery. In one embodiment, when the battery level is high the device 120 is green, when the battery level is at a midpoint the device 120 is yellow, and when the battery level is low the device 120 is red. Each of the battery levels corresponds to a battery voltage of a combined voltage of all batteries in the compartment 118. In one embodiment, the LED includes three separate LEDs of different colors within a housing. Other types of illumination devices are contemplated. In one or more embodiments, the device 120 is located at the aperture defined at element 120 or is located behind as seen in FIG. 4.

When the door 102 is in the closed position as illustrated in FIG. 1, the dispensing mechanism 119 is substantially parallel with a sheet material card 122, which is supported at the back plate 104 by a first card support standoff 124 and a second card support standoff 126. The dispensing port 108 is defined between the bottom of the door plate 116 and the bottom of the black plate 104.

The sheet material card 122 includes a rigid support 128 to which a plurality of sheets 130 are attached. Each of the sheets is stacked adjacently to one another such that a sheet 132 is exposed to the dispensing mechanism 119. In the closed position, a motor wheel 134 and a roller 136 are configured to engage the sheet 132 and to detach the sheet 132 from the rigid support 128. The sheet 132 is folded over and includes a first portion 138 which is engaged by the motor wheel 134 and the roller 136. A second portion 140 of the sheet 132 is folded over the first portion 138 and the overlying portions 138 and 140 are coupled to the sheet material card 122 at the rigid support 128. One sheet at a time is detached from the rigid support 128 for dispensing to a user. As seen in FIG. 2, the edge of the first portion 138 is relatively linear and provides a straight edge to enter the dispensing port 108. The edge of the second portion 140 includes a curved edge to expose the first portion 138 such that the first portion 138 is engaged by the motor wheel 134 and the roller 136 to detach the sheet 132.

The rigid support 128 includes a first slot 142 and a second slot 144, each of which is configured to receive respectively the standoff 124 and the standoff 126. The slots 142 and 144 extend substantially horizontally with a top edge 146 of the rigid support. Each of the slots 142 and 144 include, in one embodiment, a locating feature 148 extending from a channel 150 defined by the slots 142 and 144. Each of the locating features 148 are configured to receive the standoffs 124 and 126 such that the sheet material card 122 is held in position within the apparatus 100. In one embodiment, the locating features 148 are half circles. Other locating features are contemplated.

Each of the slots 142 and 144 further include signal apertures 152A and 152B configured to transmit a signal through the sheet material card 122 to a card light pipe 160. The card light pipe 160 is coupled to the back plate 104 and extends relatively horizontally with respect to the top edge 146. A signal, such as light signal, transmitted through one of the signal apertures 152, enters one end of the card light pipe 160, is transmitted through the card light pipe 160, and exits another end of the card light pipe 160. Detection of the signal being transmitted through the light pipe 146 is used to determine the presence of the sheet material card 122 in the apparatus 100. In the illustrated embodiment, the light pipe 160 is made of rigid material such as acrylic or polycarbonate. Other non-rigid, flexible, light pipes are also contemplated including but not limited to polycarbonate fiber that is designed to be flexible, for instance to transmit light along a curved path.

Figure 3:
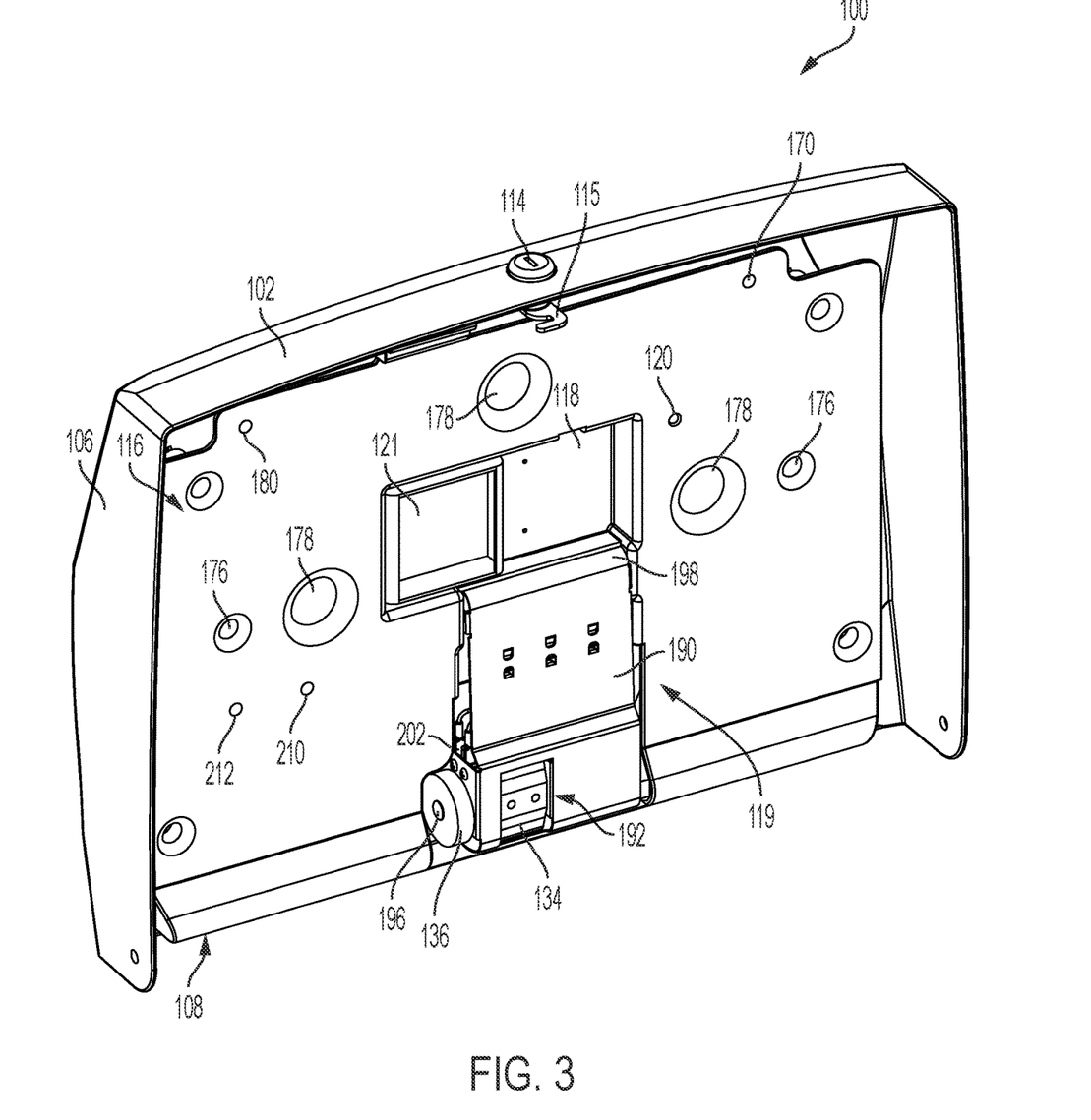
FIG. 3 illustrates a perspective view of one side of a door plate located in a cavity of a door.

The card light pipe 160 is configured to receive a light transmitted through a first card aperture 170 of the door plate 116 of FIG. 3. The light is transmitted through the first card aperture 170 by a transmitter 172 coupled to a side 174 of the door plate 116 of FIG. 4. The side 174 faces an interior portion of the door 102 when assembled to the door 102 by one or more connectors extending through connector standoffs 176. Additional support standoffs 178 extend from the side 174 of the door plate 116 to provide spaced support between the door plate 116 and the door 102.

The light transmitted through the first aperture 170 enters signal aperture 152A which then is received by the card light pipe 160. (See FIG. 2) The signal transmitted through the card light pipe 160 exits through the other end of the card light pipe 160, through aperture 152B, and through a second card aperture 180 of FIG. 3. The light transmitted through second card aperture 180 is received by a light receiver 182. See FIG. 4. The light receiver 182 is located over the second aperture 180 to receive the transmitted light. When the sheet material card 122 is in place, the transmission and receipt of the transmitted light indicates that a complete and unobstructed path exists between the transmitter 172 and the receiver 182. If the transmitted light does not reach the light receiver 182, lack of received light at receiver 182 indicates that the rigid support 128 does not include appropriately located signal apertures 152A and 152B. If either one or both of the apertures 152A or 152B is not properly located or is not present, the lack of received light indicates that the sheet material card 122 is not a correct or proper card, which may not properly dispense sheets 132. It may also indicate that the sheets that have been loaded do not have the necessary quality to perform a proper or necessary barrier protection.

FIGS. 3 and 4 further illustrate the dispensing mechanism 119, the motor wheel 134, and the roller 136. The dispensing mechanism 119 includes a motor plate 190 including an aperture 192 through which the motor wheel 134 extends during at least a portion of the dispensing of a sheet 132. A motor 194 is fixedly coupled to the motor plate 190 and includes a shaft 196 that extends from the motor 194, through the motor wheel 134 and into or through the roller 136. Each of the motor wheel 134 and the roller 136 are fixedly coupled to the shaft 196 such that rotation of the shaft 196 rotates the motor wheel 134 and the shaft 136 at the same time. In another embodiment, the shaft 196 extends to the motor wheel 134 and a second shaft or connector (not shown) extends from the motor wheel 134 to the roller 136.

Figure 8A:
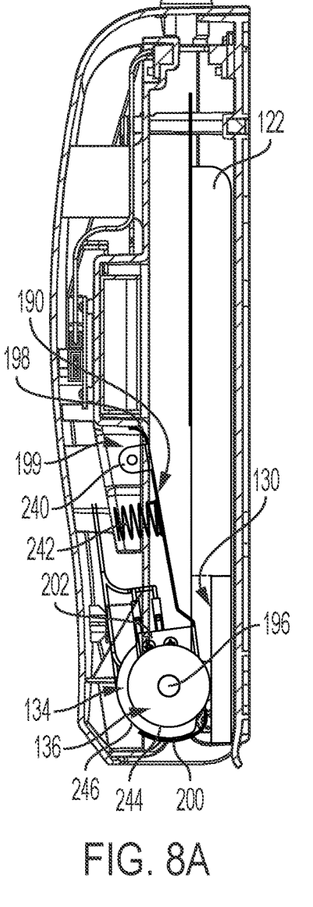
FIGS. 8A, 8B, and 8C illustrate side views of a sheet dispensing mechanism adjacently located to a sheet material card.

The motor plate 190 includes a curved upper portion 198 which is rotatably coupled to the door plate 116, with a hinge mechanism 199 (see FIG. 8) for instance, such that a bottom portion 200 is free to move away from the door plate 116 as the door plate 116 pivots about the upper portion. The bottom portion 200 is curved (see FIG. 4) and is configured to generally follow the radiused surface of the motor wheel 134. Other configurations are contemplated. The motor plate 190 further supports a motor switch 202, which in one embodiment is a microswitch. The motor switch 202 includes an arm (not shown) which opens and closes the switch. A cam 204 extends from a side of the motor wheel 134 and is off center from the shaft 196. See FIG. 4. The cam 204 engages the switch arm once every single rotation of the motor wheel 134 to transition the motor switch 202 from a closed position and an open position.

Figure 5:
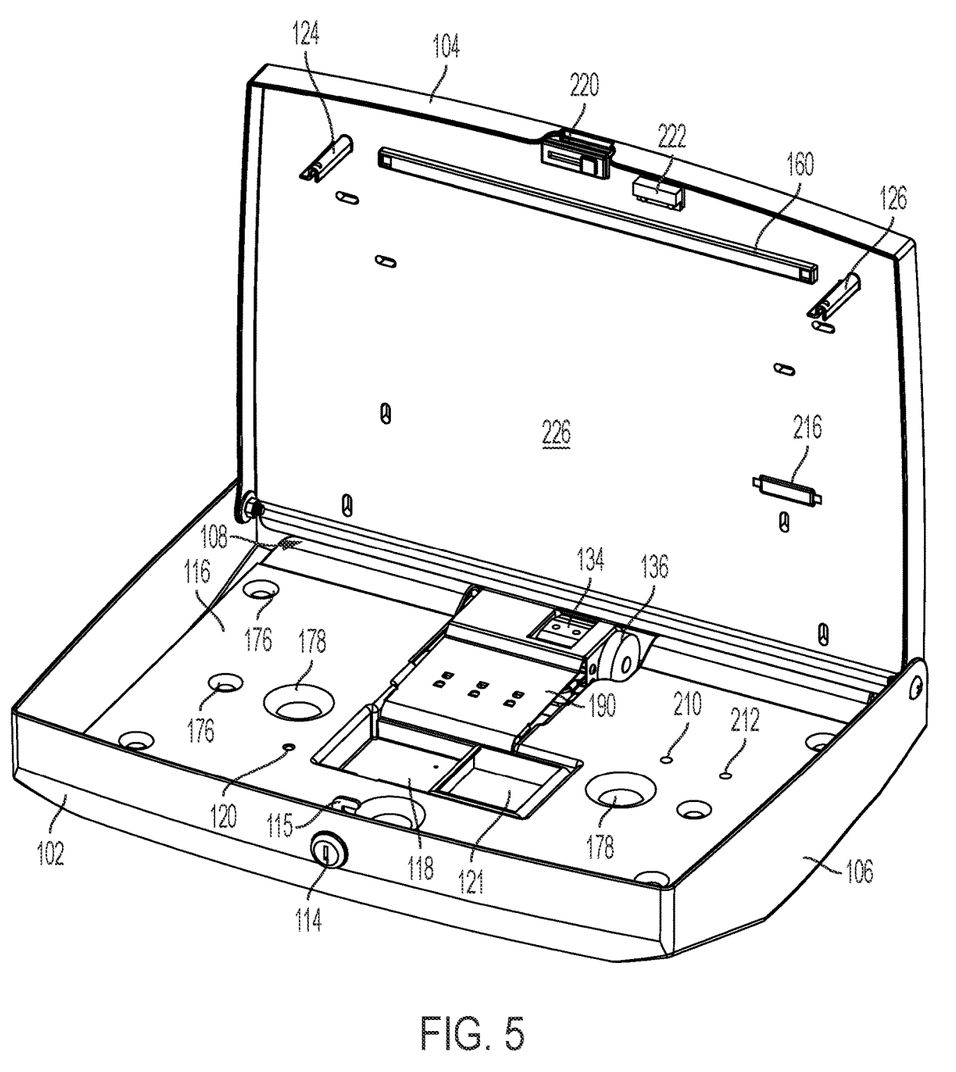
FIG. 5 illustrates a perspective view of a dispensing apparatus in an open condition lacking a sheet material card.

As further seen in FIG. 3, the door plate 116 includes a first sheet aperture 210 and a second sheet aperture 212. A sheet transmitter 214 in FIG. 4 transmits a light through the first sheet aperture 210 to a sheet light pipe 216 operatively connected to the back plate 104 as seen in FIG. 5. In FIG. 5, the sheet material card 122 is missing and consequently there are no sheets 132. When there are no sheets 132, the light transmitted by the sheet transmitter 214 passes through the first sheet aperture 210, enters an end of the sheet light pipe 216 to which the light is directed, and exits another end of the sheet light pipe 216. The light transmitted through the sheet light pipe 216 enters the second sheet aperture 212 and is received by a sheet receiver 218. A complete transmission of light from the sheet transmitter 214 to the sheet receiver 218 indicates that: i) the apparatus 100 does not include the sheet material card 122; or ii) that the sheet material card 122 is out of sheets 132. To determine the presence or absence of sheets 132, the sheet transmitter 214 and the sheet receiver 218 are located to transmit and receive light at a location below the rigid support 128. Consequently, when the sheet material card 122 no longer includes sheets, the transmitted light passes below the sheet material card 122 since the sheets 132 are no longer present to block transmission of the light. Non-receipt of the light at the sheet receiver 218 indicates the presence of a sheet or sheets 132, while receipt of the light indicates that absence of a sheet or sheets 132. If the sheet receiver 218 receives light, an alert is generated to either: i) indicate that the apparatus is out of sheets of sheet material; or ii) the motor is disable from driving the motor wheel to prevent the motor wheel from rotating; or iii) both.

FIG. 5 additionally illustrates a lock receiver 220 to receive the catch 115 to lock and unlock the apparatus 100. A lock switch magnet 222 is fixedly coupled to the back plate 104 which activates a lock switch 224. See FIG. 4. In one embodiment, the lock switch 224 is a reed switch which is activated by the lock switch magnet 222 to change the state of the reed switch for indicating that the door 102 is closed. In one embodiment, when the door 102 is open, the reed switch 224 is open to indicate that the door 102 is open. When the door 102 is closed, the reed switch 224 is closed by the proximity of the lock switch magnet 222 with the reed switch 224. Upon closing, the battery illumination device 120 is turned off to conserver power.

Figure 6:
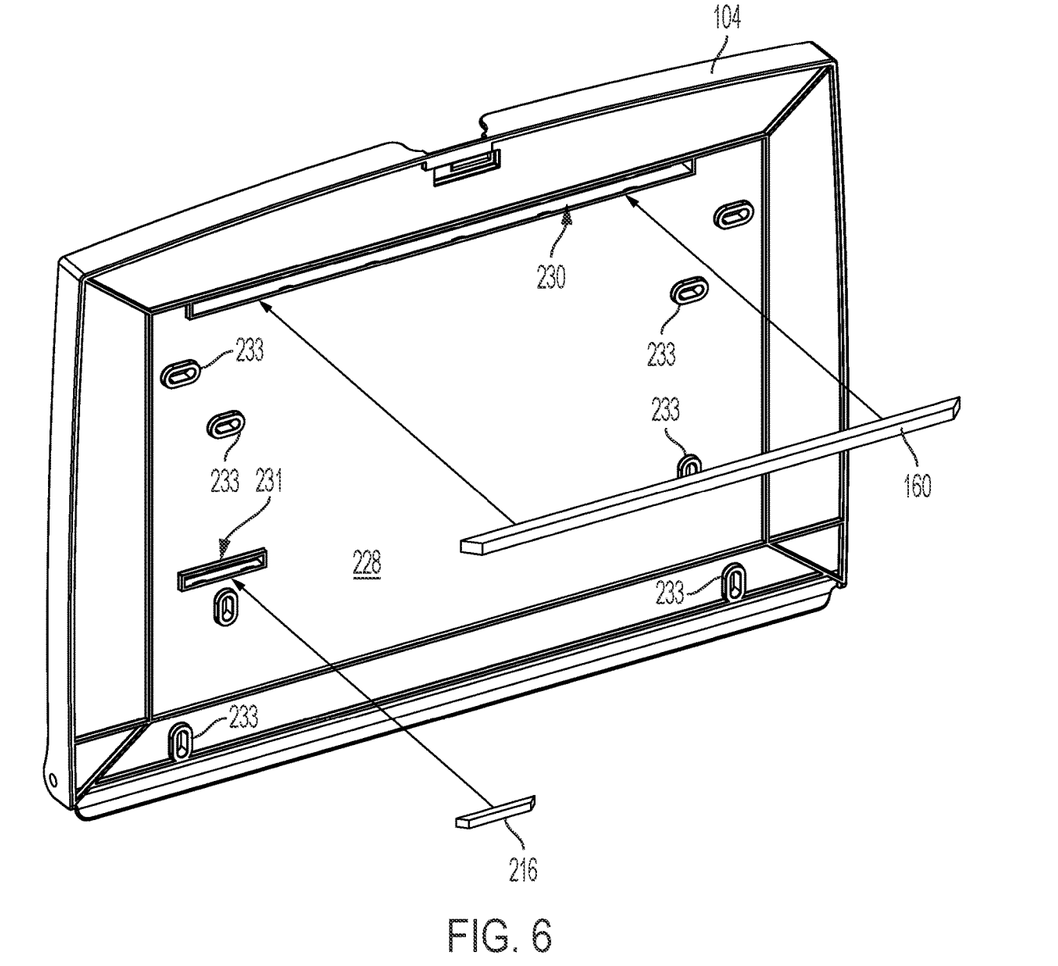
FIG. 6 illustrates a perspective view of a back of a dispensing apparatus.

The first light pipe 160 and the sheet light pipe 216 extend from an inner surface 226 of the back plate 104. In one embodiment, the back side of the back plate 104, as seen in FIG. 6, includes an outer surface 228 having a first cavity 230 for first light pipe 160 and a second cavity 231 for the sheet light pipe 216. During assembly, the light pipes 160 and 216 are inserted into the respective cavities. The outer surface 228 further includes a plurality of connector features 233 configured to receive connectors for connecting the back plate 104, and consequently the apparatus 100, to a supporting structure.

Figure 7:
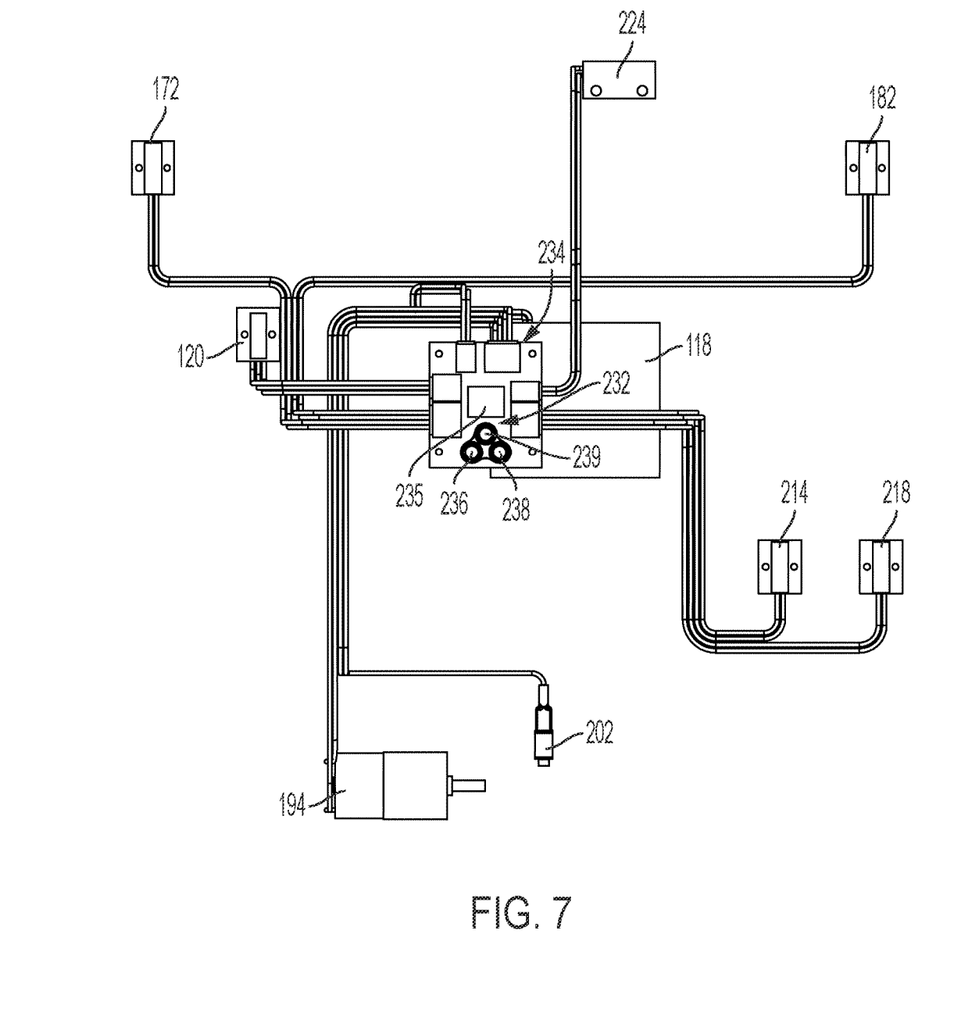
FIG. 7 illustrates a block diagram of a dispenser apparatus.

Returning to FIG. 4, and as illustrated in the block diagram of FIG. 7, the apparatus 100 includes control module 234 fixedly coupled to the door plate 116 and electrically coupled to the battery light 120, the card transmitter 172, the card receiver 182, the motor 194, the switch 196, the motor switch 202, the sheet transmitter 214, and the sheet receiver 218. The control module 234 is also known as a mother board and includes a printed circuit board (PCB) and one or more controllers such as a microprocessor, including a processer 235, and a memory, and various connectors for connecting to the various parts as illustrated. In one or more embodiments, the memory is included in the processor 235 and in other embodiments, the memory is an external device coupled to the processor. The sensor 232 includes a receiver 236, a transmitter 238, and an illumination device 239, such as an LED. In one embodiment, the sensor 232 transmits an infrared signal from the transmitter 238 and through the sensor window 112. When a person's hand or an object is moved in front of the sensor 232, the transmitted light is reflected and is sensed by the receiver 236. At this point, the control module 234 receives a signal from the receiver 236 indicating that a user is requesting one of the sheets 130. The control module 234 transmits a signal to the motor 194 to activate the motor wheel 134 to start turning and continuing to turn a full revolution, about 360 degrees, i.e. one complete rotation of the motor wheel 134 until the cam 204 contacts the arm of the motor switch 202 which stops the motor wheel 134 from further rotation.

The processor 235 is configured to execute program instructions stored in the associated memory. The memory is configured to store the program instructions and the processor 235 is configured to execute the stored program instructions in response to transmitted signals received from user sensor 232, other transmitted signals from the receivers, the motor, the switches, and to respond to received signals for providing status of the apparatus, as well as to indicate the presence or absence of a proper sheet material card 122, and the absence or presence of sheets 130. In addition, the control module 234 is operatively connected to the motor 194, as described herein, to dispense a sheet of material.

The control module 234, in different embodiments, includes a computer, computer system, or other programmable devices. In other embodiments, the control module 234 includes one or more processors (e.g. microprocessors or programmable controller chips), and an associated memory, which can be internal to the processor of external to the processor. The memory can include random access memory (RAM) devices comprising the memory storage of the processor 235, as well as any other types of memory, e.g., cache memories, non-volatile or backup memories, programmable memories, or flash memories, and read-only memories. In addition, the memory, in different embodiments, includes a memory storage physically located elsewhere from the processing devices and any cache memory in a processing device, as well as any storage capacity used as a virtual memory, e.g., as stored on a mass storage device or another computer coupled to the controller. The mass storage device can include a cache or other dataspace which can include databases. Memory storage, in other embodiments, is located in the "cloud", where the memory is located at a distant location which provides the stored information wirelessly to the control module 234. In one or more embodiments, the memory storage tracks use of the apparatus 100 to determine when the apparatus is out of sheets or when the apparatus is refilled with a sheet card. In this way, use of the apparatus is tracked. In this configuration, the apparatus includes a hardwired or wireless transmitter to transmit information of the external memory of to a web based cloud.

FIG. 7 illustrates the block diagram of the dispenser apparatus 100 described above with FIG. 4.

Figure 8B:
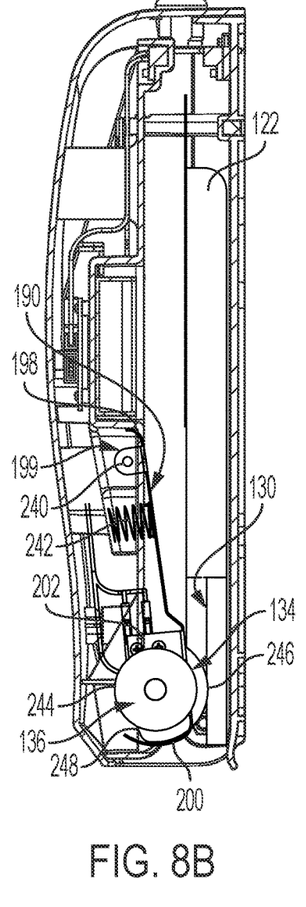
Figure 8C:
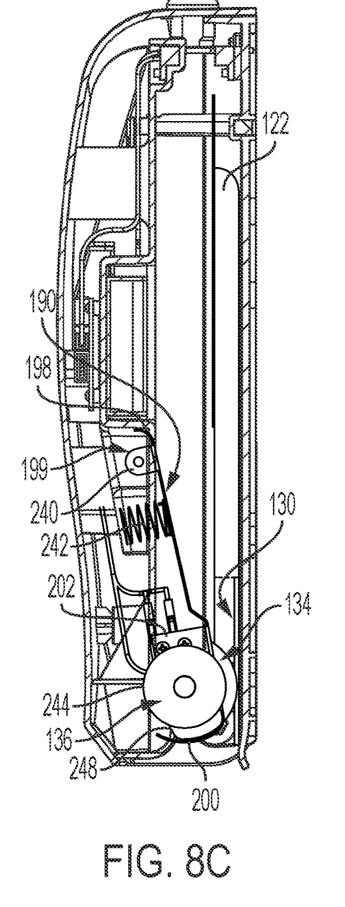

FIGS. 8A, 8B, and 8C illustrate side views of the sheet dispensing mechanism 119 for dispensing of a single sheet 130 from the sheet material card 122 by application of the motor wheel 134 and the roller 136 to the sheet 130. The motor plate 190 is operatively connected to the door plate 116 with a shaft or pin (not shown) extending through tabs 240, one of which is shown. A second tab, not shown, is located on an opposite side the motor plate 190. One or more resilient members 242 are located between the motor plate 190 and a support portion of the door plate 116. In one embodiment, the resilient members are springs. Other types of resilient members are contemplated including a spring that surrounds the shaft extending through the tabs 240.

The resilient members 242 apply a pressure to the motor plate 190 to force the motor plate toward the sheet 130 such that the roller 136 is in contact with the sheet 130 during detachment and dispensing of the sheet. The roller 136 includes a roller surface 244 defining a continuous surface having a circumference centered about the shaft 196. The continuous surface defines a constant radius about the shaft 196. The motor wheel 134 is also moved toward the sheet 130 but does not contact the sheet 130 before a user requests dispensing a sheet by activating the sensor 232 or once a sheet has been completely dispensed.

In FIG. 8A, the motor wheel 134 includes a radiused surface 246 having a first radius, defined between the motor shaft 196, and includes a truncated surface 248 which is substantially flat. See also FIG. 3. In one embodiment, the truncated surface is a circle segment. Other truncated surfaces are contemplated. The truncated surface 248 includes a second radius defined between the shaft 196 and the truncated surface 248 of the motor wheel 134. The truncated surface 248 does not contact the sheet 130 in FIG. 8A and is positioned at this location prior dispensing a sheet 130. Once the motor 196 has been activated by the control module 234, the motor 194 drives the motor shaft 196 to rotate the motor wheel 134 and to move the radiused surface 246 to engage the sheet 130. Because the radiused surface 246 includes a radius larger than the radius of the roller 136, the surface of the roller 136 is pushed away from the exposed sheet 130 when the radiused surface 246 begins to contact the sheet 130. Contact between the sheet 130 and the radiused surface 246 detaches the sheet from the sheet material card 122. The sheet 130 continues to be pulled in a downward direction, as illustrated, by the roller 136 once the radiused surface 246 of the motor wheel 134 no longer is in contact with the sheet. Continued rotation of the motor wheel 134 continues to move the detached sheet toward the dispensing port 108. Once the cam 204 contacts switch 202, the motor 194 stops. After the truncated surface 248 returns to its position facing the sheets as seen in FIG. 8A, the roller 136 returns to contact the next exposed sheet 130, as seen in FIG. 8A. In this position, the roller surface 244 continues to contact the sheet 130 until the next sheet 130 is contacted by the truncated surface 248.

As sheets 130 continue to be dispensed, the stack of sheets 130 becomes smaller as illustrated in FIG. 8C. During this time, the resilient members 242 continue to force the motor wheel 134 and the roller 136 toward the back wall 104.

When the apparatus 100 is out of paper as indicated by the sheet receiver 218, the illumination device 238 flashes on and off. In one embodiment, a red LED flashes on and off. When the truncated surface 248 returns to the position of FIG. 8A, the switch 202 has changed its position, which is recognized by the processor 235. The processor 235 transmits a signal to the processor 235 that the apparatus 100 is ready to dispense a sheet by illuminating a flashing green LED of the illumination device 238. Once the sensor 232 receives an indication that a user desires to dispense a sheet, the flashing green LED turns off to indicate that a sheet is ready to be pulled down by the user.

While exemplary embodiments incorporating the principles of the present disclosure have been described hereinabove, the present disclosure is not limited to those embodiments. For instance, in other embodiments, the apparatus and method of dispensing sanitation products includes dispensing of different types of substrates including flat, interfolded, and or roll form substrates for use in both the consumer market and the away from home (AFH) market. The apparatus and dispensing of such substrates includes, but is not limited to: i) dispensing of sheeted tissue products that act as a sanitation barrier for various surfaces in both the commercial market environments, including food service, and consumer market environments; ii) dispensing of sheeted tissue and or toweling products for personal cleaning; iii) dispensing of folded tissue, toweling and or wiping products for surface sanitation, for drying and for cleaning, as well as personal sanitation, drying and cleaning; and iv) dispensing of roll tissue, toweling, and wiping products, both perforated and non-perforated, for surface and personal sanitation.

As described herein, the dispenser apparatus 100, including the sheet material card 122 and the sheets 130, provides a unique system to dispense sheeted tissue products in response to fiber optic activation. The sheet material card includes cutouts, the slots 142 and 144, which are configured to locate the card at a predetermined location within the apparatus. By being able to repeatably locate the sheet material card within the apparatus, the light transmitters and light receivers are aligned with the light pipes which enables the fiber optic activation for dispensing sheet products.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A sheet dispensing apparatus for dispensing one or more sheets from a plurality of sheets, the apparatus comprising:
   a light pipe;
   a first transmitter to transmit light, the first transmitter spaced from a first end of the light pipe, the first transmitter adapted to transmit light through the first end of the light pipe;
   a first receiver to receive light, the first receiver spaced from a second end of the light pipe to receive light transmitted by the first transmitter through the light pipe;
   a dispensing mechanism configured to dispense one or more sheets from the plurality of sheets; and
   a controller operatively connected to the dispensing mechanism and to the first receiver, the controller including a processor and a memory configured to store program instructions and the processor is configured to execute the stored program instructions to:
      determine whether the transmitted light is received or not received by the first receiver; and
      if received, enable the dispensing mechanism to dispense a sheet from the plurality of sheets.

2. The sheet dispensing apparatus of claim 1 further comprising:
   a second light pipe;
   a second transmitter to transmit light, the second transmitter spaced from the second light pipe, the second transmitter adapted to transmit light through the second light pipe;
   a second receiver spaced from the second light pipe to receive light transmitted by the second transmitter through the second light pipe; and
   wherein the controller determines whether light is received by the second receiver through the second light pipe, and if so, wherein the controller identifies that the sheet dispensing apparatus is out of sheets.

3. The sheet dispensing apparatus of claim 2 further comprising a first plate and at least one standoff extending from the first plate, wherein the standoff supports the plurality of sheets at a predetermined location to enable the dispensing mechanism to dispense one or more sheets from the plurality of sheets.

4. The sheet dispensing apparatus of claim 3 wherein the first light pipe is coupled to the first plate.

5. The sheet dispensing apparatus of claim 4 wherein the second light pipe is coupled to the first plate.

6. The sheet dispensing apparatus of claim 5 further comprising a second standoff extending from the first plate wherein the second standoff supports the plurality of sheets at the predetermined location.

7. The sheet dispensing apparatus of claim 5 further comprising a second plate spaced from the first plate, wherein the second plate includes apertures and wherein the first transmitter, the first receiver, the second transmitter, and the second receiver are located on the second plate at the apertures to transmit and to receive the light through the apertures.

8. The sheet dispensing apparatus of claim 7 wherein the dispensing mechanism is supported by the second plate.

9. The sheet dispensing apparatus of claim 8 wherein the first plate and the second plate are rotatably coupled together at a pivot connection such that the first and second standoffs extend toward the second plate in a closed position of the first plate and second plate.

10. A method of dispensing a sheet from a plurality of sheets attached to a sheet support located in a sheet dispensing apparatus having a dispensing mechanism, the method comprising:
    transmitting a first signal from a first side of the sheet support toward a first end of a first light pipe located on a second side of the sheet support;
    receiving the first signal from a second end of the first light pipe; and
    enabling, upon receiving the first signal from the second end of the first light pipe, the dispensing mechanism to detach a sheet from the plurality of sheets.

11. The method of claim 10 further comprising:
    transmitting a second signal to a first end of a second light pipe;
    not receiving the second signal from a second end of the second light pipe; and
    enabling, upon not receiving the second signal, the dispensing mechanism to detach a sheet from the sheet material card.

12. The method of claim 11 further comprising driving a roller of the dispensing mechanism to detach the sheet from the sheet support when both the step of enabling, upon receiving the first signal, and the step of enabling, upon not receiving, the second signal, have occurred.

13. The method of claim 12 further comprising not enabling, upon receiving the second signal, the roller to detach the sheet from the sheet support.

14. A sheet material product for use by a sheet dispensing apparatus having standoffs to support the sheet material product and a wheel to dispense sheet material, the sheet material product comprising:
    a plurality of sheets;
    a support supporting the plurality of sheets, the support including: i) a first slot and a second slot configured to engage the standoffs, ii) a first side, iii) a second side, and iv) a length, wherein a portion of each of the plurality of sheets extends beyond the length of the support;
    an aperture disposed on the support, wherein the aperture enables transmission of a light beam from the first side of the support to the second side of the support.

15. The sheet material product of claim 14 wherein the first slot and the second slot each include a locating feature configured to receive one of the standoffs.

16. The sheet material product of claim 15 wherein each of the plurality of sheets is folded over and stacked adjacently to one another.

17. The sheet material product of claim 16 wherein each of the plurality of folded over sheets includes a first portion and a second portion, the first portion being shorter than the second portion such that the first portion is exposed with respect to the second portion.

18. The sheet material product of claim 17 wherein the second portion is disposed adjacently to the wheel such that engagement of the wheel to the sheet dispenses the engaged sheet.

19. The sheet material product of claim 18 wherein the first portion includes a relatively straight edge configured to enter a dispensing port of the sheet dispensing apparatus.

20. The sheet material product of claim 19 wherein the second portion includes a curved edge to expose the first portion to the wheel.

* * * * *